| United States Patent [19] | | [11] | 4,234,714 |
|---|---|---|---|
| Earing et al. | | [45] | Nov. 18, 1980 |

[54] PREPARATION OF SINGLE-PHASE, URETHANE PREPOLYMERS FROM HYDROXY-TERMINATED DIENE POLYMERS

[75] Inventors: Mason H. Earing, Williamsville; Leonard H. Gielinski, West Seneca, both of N.Y.; Paul F. Martin, Fairfield, Ohio; Glenn H. Petschke, Tonawanda, N.Y.

[73] Assignee: Textron Inc., Providence, R.I.

[21] Appl. No.: 25,046

[22] Filed: Mar. 29, 1979

[51] Int. Cl.³ ............... C08G 18/08; C07C 125/077; C08G 18/62

[52] U.S. Cl. .................................. 528/67; 528/59; 528/75; 560/25; 560/115

[58] Field of Search ............... 528/67, 75, 59; 560/25

[56] References Cited

U.S. PATENT DOCUMENTS

| 2,692,873 | 10/1954 | Langerak et al. ............... 260/77.5 |
|---|---|---|
| 2,877,212 | 3/1959 | Seligman ............................ 528/52 |
| 3,338,861 | 8/1967 | Mastin et al. ....................... 528/63 |
| 3,362,979 | 1/1968 | Bentley ............................... 528/288 |
| 3,384,653 | 5/1968 | Erner et al. ........................ 528/72 |
| 3,674,743 | 7/1972 | Verdol et al. ...................... 528/75 |
| 3,714,110 | 1/1973 | Verdol et al. ............... 260/33.6 AQ |
| 3,814,736 | 6/1974 | Gibier-Ramband et al. ......... 528/67 |
| 4,031,026 | 6/1977 | Ibbotson ............................. 528/67 |
| 4,067,820 | 1/1978 | Wagner et al. ..................... 528/67 |
| 4,115,429 | 9/1978 | Reiffet et al. ...................... 528/67 |
| 4,125,545 | 11/1978 | Kroplinski et al. ............ 260/404.5 |

*Primary Examiner*—H. S. Cockeram
*Attorney, Agent, or Firm*—Bernard & Brown

[57] ABSTRACT

A process is described for the preparation of urethane prepolymers from hydroxy-terminated diene polymers and normally liquid, relatively non-volatile, aromatic polyisocyanates. The prepolymers are made at a temperature above about 150° C. to provide urethane prepolymer products that resist the tendency to form multiple phases or layers upon storage at room temperature.

18 Claims, No Drawings

PREPARATION OF SINGLE-PHASE, URETHANE PREPOLYMERS FROM HYDROXY-TERMINATED DIENE POLYMERS

This invention relates to the preparation of single phase, urethane prepolymers. More particularly, this invention relates to a process for making urethane prepolymers from hydroxy-terminated diene polymers and normally liquid, relatively non-volatile, aromatic polyisocyanates wherein the prepolymer product resists the tendency to form multiple phases or layers on storage at room temperature, even though it has an isocyanate group content of at least about 10 weight percent.

Conventional urethane prepolymer systems when based on aromatic polyisocyanate starting materials generally employ toluene diisocyanate or methylene bis(phenyl isocyanate). Preparation of prepolymer systems from these polyisocyanate starting materials is usually accomplished by reacting the polyisocyanate with a suitable dihydroxy or other polyhydroxy compound at a temperature of up to about 90° C. or less to form a clear, storage-stable single phase prepolymer product. The volatile nature of toluene diisocyanate has, however, tended to restrict its use due to government regulations, including those of the Occupational Safety and Health Act, which limit the concentration of polyisocyanate in the ambient atmosphere. Accordingly, relatively non-volatile, aromatic polyisocyanates such as methylenebis(phenylisocyanate) and polymeric polyisocyanates such as polyarylene polyisocyanates have become of greater interest in urethane polymer systems. Certain of these non-volatile polyisocyanates such as the widely used, substantially pure para,para'-isomer of methylenebis(phenylisocyanate) are in the solid phase at room temperature, and to facilitate their use in liquid handling systems they must be maintained at an elevated temperature. When employing a normally solid, polyisocyanate as a reactant, small amounts of the unreacted polyisocyanate in the urethane-containing reaction mixture tend to crystallize from the product solution at room temperature, obscuring the desired clarity in the product.

Some other polyarylene polyisocyanates, including a modified version of methylenebis(phenylisocyanate) which has been treated with a trihydrocarbyl phosphate according to the process described in U.S. Pat. No. 3,384,653 (Upjohn), incorporated herein by reference, are in the liquid phase at room temperature. These liquid polyisocyanates are more easily handled and can be employed with this advantage.

Urethane polymer systems prepared using various hydroxy-terminated diene polymers as starting materials in the system are also quite well known, see, for example, U.S. Pat. Nos. 3,714,110; 3,338,861 and 2,877,212, all of which are incorporated herein by reference. Urethane products prepared from such starting materials are of interest because of their outstanding moisture and hydrolytic stability, flexibility and other advantageous characteristics. With regard to prepolymer systems prepared from normally liquid, relatively non-volatile, aromatic polyisocyanates using known techniques that employ the usual reaction temperatures of the order of about 90° C. or less to make the prepolymers having an isocyanate group content of at least about 10 weight percent, it has been found that the prepolymer products made from polybutadiene-based polyols form multiple phases or layers upon storage at room temperature. The multiphase characteristic of the prepolymers has been a major detriment to their use on a practical basis. On storage, the layer separation makes their use in high volume industrial production difficult, if not completely impractical.

The environmental acceptability of relatively non-volatile polyisocyanates and the outstanding characteristics of urethane systems which employ hydroxy-terminated diene polymers as a starting material make it highly desirable to employ both materials in a urethane system. The preparation of urethane polymers from hydroxy-terminated diene polymers and, for instance, methylene-bis(phenylisocyanate) is known as described in U.S. Pat. No. 3,338,861 (see Example 3 at column 5, line 17 et seq. and Example 7, column 6, line 16 et seq.) and in U.S. Pat. No. 3,714,110 (see Example VIII, lines 1 et seq.). However, prepolymer systems which employ both normally liquid, non-volatile polyisocyanates and hydroxy-terminated diene polymers as starting materials in known preparative techniques, suffer from the tendency discussed above to form multiple phases or layers on storage which significantly limits their commercial potential. This may explain why neither of the above patents has a specific example describing the use of a prepolymer made from these starting materials. Prepolymer systems made from these materials which, however, avoid the undesirable multiphase characteristics would be highly desirable.

Accordingly, the present invention provides a process for making urethane prepolymers from hydroxy-terminated diene polymers and normally liquid, relatively non-volatile polyisocyanates, wherein the prepolymer products resist the tendency to form multiple phases or layers upon storage at room temperature even though they have an isocyanate group (NCO) content of at least about 10%. The process of the invention involves preparation of the prepolymer by reacting the hydroxy-terminated diene polymer and normally liquid, non-volatile polyisocyanate at a temperature which ranges above about 150° C. Generally, reaction temperatures above about 200° C. are not required, and temperatures that are too high may have a deleterious effect on the product or reaction system. The preferred reaction temperatures are about 160° to 180° C. The reaction is continued long enough to give the desired stable, single phase product, and generally the urethane-forming reaction will be substantially completed at such time. Reaction times of about an hour or more, for example, about 1.5 to 4 hours have been found to be suitable. The isocyanate group content of the prepolymer reaction products may be present substantially entirely as part of the urethane structure, although a small amount of unreacted polyisocyanate may well be present. Thus, the products may contain minor amounts of unreacted polyisocyanate which may even contribute substantially to the total isocyanate group content of the products which generally does not exceed about 20%. If desired, a minor amount of benzoyl chloride may be added to the product after formation to stabilize the prepolymer against haze formation due to moisture pick-up, although this additive is generally not required to provide a product prepolymer having the desired stable, single phase characteristics.

The prepolymers of the invention can be chain-extended to form synthetic resin materials useful as liquid castable elastomers, adhesives, caulks, sealants, potting and encapsulating compositions and related urethane materials of the type which have become of commercial significance within the past decade and are projected to be of even further importance in the future. In these and other uses it is desired that the prepolymer be substantially free of solvent which may be another reason why the two-phase system is formed when the usual preparative technique is used. Thus, the prepolymers of this invention are preferably substantially solvent-free. If any solvent be present it is not in such amount, considering its type, as to give a stable, single phase product when prepared at temperatures of up to about 90° C.

As mentioned above, the isocyanates that are an essential reactant in the process of this invention are normally liquid, relatively non-volatile, aromatic polyisocyanates. The process involves the use of aromatic polyisocyanates that are in the liquid phase at room temperature, since normally solid phase isocyanates, such as substantially pure methylenebis (para, para'-phenylisocyanate), tend to crystallize from the prepolymer upon storage at room temperature obscuring the desired product clarity. Examples of normally liquid, relatively non-volatile polyisocyanates with which the hydroxy-terminated diene polymers may be reacted in accordance with the present invention, include trihydrocarbyl phosphate-modified methylenebis(-phenylisocyanate) and aromatic isocyanate polymers which are normally liquid at room temperature such as polyarylene polyisocyanate, e.g., polyphenylene polyisocyanates such as PAPI. The materials sold commercially as PAPI (polyarylene polyisocyanate) have the following theoretical structure:

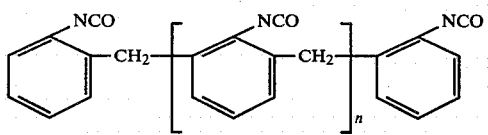

in which n is one or more. Other normally liquid, relatively non-volatile, aromatic polyisocyanates include mixed isomer materials such as those containing both of the para, para'- and ortho, para-isomers of methylene bis(phenylisocyanate), often along with some polymer thereof, see U.S. Pat. No. 3,362,979 incorporated herein by reference. As noted, the polyisocyanates that are essential reactants in the process of the invention are relatively non-volatile, having vapor pressures that are, for example, less than about 0.0005 mm Hg at 25° C., or even less than about 0.0001 mm Hg at 25° C. The normally liquid, relatively non-volatile polyisocyanates are often the only isocyanates used in the reaction, although other isocyanates may also be reacted in minor amounts based on the functionality of the total amount of isocyanate-containing rectants utilized.

Among the preferred isocyanates which may be employed in the process is Upjohn's ISONATE 143L, a trihydrocarbyl phosphate-modified methylene bis(-phenylisocyanate) of the type disclosed in U.S. Pat. No. 3,384,653. According to the patent, commercially available substantially pure methylenebis(phenyl isocyanate), normally a solid having a melting point of about 40° C., is transformed to a storage-stable liquid by heating at a temperature of about 160° to 250° C. in the presence of from about 0.1 to about 3 percent by weight of a trihydrocarbyl phosphate. Trialkyl phosphates wherein the alkyl substituent contains from 1 to 12 carbon atoms, e.g., triethyl phosphate, are disclosed as preferred. Although the requisite heating time is a function of both the amount of trihydrocarbyl phosphate employed and the reaction temperature, in general the heating time required is disclosed to be from about one quarter to about 4 hours. Other preferred isocyanates include PAPI 901 (also sold by Upjohn), and MONDUR MRS-10 (M432) (sold by Mobay), which are polyarylene polyisocyanates.

The polyisocyanate and polyhydroxy materials employed in the process of this invention are reacted in amounts to give an isocyanate-terminated prepolymer having an isocyanate group content of at least about 10 weight percent. Thus, the total amounts of isocyanate-containing reactant and polyhydroxy, or other polyfunctional material reactive with the polyisocyanate, are such that sufficient excess of isocyanate reactant is present to give an isocyanate product of this type. The reaction mixture may contain other reactive materials as long as they are not used in such amounts that the prepolymer product is unduly adversely affected, and the advantage of the relatively high reaction temperature employed in the process of the invention is not lost.

An essential polyhydroxy reactant is the hydroxy-terminated diene polymer component. Although this material may be the only polyhydroxy reactant utilized, others may also be present, but, if so, they generally are a minor amount of the total polyhydroxy component reacted. The useful hydroxy diene polymers contain a relatively long, essentially hydrocarbon chain due to the polymerization of the diene component with or without additional monomers. The diene polymers are generally in the form of viscous oils, i.e., they are normally liquid, at ambient temperature. Polyhydroxy-terminated diene polymers of the type disclosed in U.S. Pat. No. 3,338,861 may be employed in the process of the present invention. As discussed more fully in the patent, such polyhydroxy-terminated polymers may be made by polymerizing conjugated dienes of about 4 to 8 carbon atoms with lithium metal to obtain a polymeric product having the desired molecular weight. The product may then be treated with a suitable terminating agent, such as ethylene oxide, propylene oxide, formaldehyde, etc., to provide hydroxyl-termination. By using this procedure, polyhydroxy-terminated diene polymers having molecular weights from about 700 to 12,000 may be obtained. If desired, the polymers may be further treated, for instance by hydrogenating to satisfy all or part of the unsaturation.

Other polyhydroxy-terminated diene polymers that may be employed in the process of the present invention are of the type disclosed in U.S. Pat. No. 2,877,212. According to the patent, the polymers are prepared by polymerizing ethylenically-unsaturated monomers, including conjugated dienes, in the presence of certain free radical catalysts. Conjugated dienes disclosed for use in preparing the polymers include butadiene, isoprene, 2,3,-dimethyl-butadiene, chloroprene, etc. The resultant polymers are terminated at each end with functional groups that may be readily convertible to the desired groups by known chemical transformations. Free radicals disclosed for making the polymers include aliphatic azodicarboxylates. The polymeric products obtained are, according to the patent, viscous oils under standard conditions, the products having hydroxyl numbers of from about 20 to 70 and molecular weights of from about 1,000 to 5,000.

A group of preferred hydroxy-terminated diene polymers of the instant invention are described in U.S. Pat.

No. 3,714,110 as having primary hydroxyl groups which are allylic in configuration, thereby being of a more reactive nature in the urethane-forming reaction and apparently providing improved stability in the urethane product. The preferred diene polymer also has the majority of its unsaturation in the main hydrocarbon chain, providing polymers of improved elastic characteristics. These polymers have also been found to have high trans-1,4-unsaturation. There may be more than two hydroxyls in the polymer molecule, and which provides cross-linking sites that may dispense with the need to employ excess isocyanate or other extraneous cross-linking agents, e.g., trifunctional reactants such as triol, in the urethane-forming reaction when such properties are desired.

Dienes which may be employed to make the hydroxy-terminated diene polymers are unsubstituted, 2-substituted or 2,3-disubstituted 1,3-dienes of up to about 12 carbon atoms. The diene preferably has up to about 6 carbon atoms and the substituents in the 2- and/or 3-position may be hydrogen, alkyl, generally lower alkyl, e.g., of 1–4 carbon atoms, halogen, nitrile, etc. Typical dienes which may be employed are 1,3-butadiene, isoprene, chloroprene, 2-cyano-1,3-butadiene, 2,3-dimethyl-1,3-butadiene, etc. A preferred diene polymer which may be employed is of the type disclosed in U.S. Pat. No. 3,674,743, incorporated herein by reference. This diene has the majority of its unsaturation in the main hydrocarbon chain, a Brookfield viscosity at 30° C. of about 5–20,000 poises, a number average molecular weight of about 400 to 25,000, and is made by hydrogen peroxide catalyzed, free-radical polymerization at a temperature of about 100° to 200° C.

The hydroxyl-terminated diene homopolymers used in accordance with the present invention preferably have a hydroxyl-functionality greater than two, e.g., in the range of 2.1 to 2.6, although the functionality may exceed the range cited, e.g., it may range up to about three or more. These polymers have been found to have primary hydroxyl groups in terminal allylic positions on the main, generally longest, hydrocarbon chain of the molecule. By "allylic" configuration is meant the alpha-allylic grouping of allylic alcohol, that is, the hydroxyls of the diene polymer or the hydroxyl residues of the finished elastomer are attached to a carbon adjacent a double-bond carbon. Diene polymers of the desired configuration may be obtained, for instance, by using a procedure of the type set forth in the specification of U.S. Pat. No. 3,714,110 at column 5, line 63 through column 6, line 27, incorporated herein by reference.

The useable liquid (including semi-solid, etc.) hydroxy-terminated diene polymers of butadiene will preferably conform to the following simplified chemical structure:

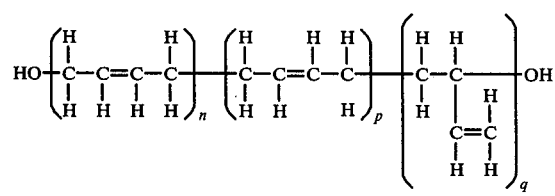

in which n plus p is greater than q, that is, the in-chain unsaturation accounts for more than 50% of the unsaturation. One or more of the H atoms appearing in the above formula will be replaced by hydroxyl in at least some of the molecules. This formula should not be understood as implying that the polymers are necessarily in blocks, but the cis-1,4-, trans-1,4- and vinyl (1,2) unsaturation are usually distributed throughout the polymer molecule. The letter n may be a number sufficient to give a cis-1,4-unsaturation content of about 10–30 percent; p may be a number sufficient to give a trans-1,4-unsaturation content to the polymer in the range of about 40–70 percent while q may be sufficient to give a pendant 1,2-vinyl unsaturation of about 10–35 percent. Often the polymer will contain largely trans-1,4-units, e.g., about 50–65 percent and about 15–25 percent cis-1,4-units, with about 15–25 percent 1,2-units. Branching may also occur in the above polymers, especially those prepared at higher temperatures. It should be emphasized, however, that the present invention is not necessarily limited to the use of hydroxyl-containing polydiolefins having the predominating trans-1,4-structure, although such are preferred.

Olefinically-unsaturated monomers may be incorporated into the diene polymers used in this invention, although generally in minor amounts. These monomers may be components which provide additional cross-linking sites for the diisocyanate or other urethane-producing agent. Useable monomers include alpha-mono-olefinic materials of about 2 to 3 to 10 or 12 carbon atoms such as styrene, methyl methacrylate, acrylonitrile, and the like. The choice and amount of mono-olefinic monomer employed will often be determined on the basis of properties desired in the final elastomer resin. Preferably, the amount of mono-olefinic monomer in the polymer, if any, will be about 1 to 40 weight %, or even about 10–40%.

The urethane prepolymers made by the process of the present invention lend themselves to the preparation of "two-step" polymers where in the second polymerization step the terminal isocyanate residues of different molecules are joined by means of suitable polyfunctional compounds such as glycols, polyamines or even, in some cases, water. The prepolymers may be reacted with polyhydroxy materials such as glycols, including polyglycols, polyesters and further amounts of hydroxyl-terminated polydiene, to give additional urethane linkages in the finished polymer. When reacted with polyamines, especially diamines, urea-urethane polymers are formed. A wide variety of aromatic and aliphatic diamines may be employed as reaction components to make urea-urethane elastomers from the prepolymers made by the process of the invention. Examples of appropriate chain extending agents and a detailed description of the conditions of polymerization using prepolymers of the same general type used in the instant invention and the chain extending agents are provided at columns 8 and 9 of U.S. Pat. No. 3,714,110, incorporated herein by reference.

As mentioned above, a minor amount of benzoyl chloride may optionally be added to stabilize the prepolymer against haze formation due to moisture pickup. Its presence is not required, however, to provide a product prepolymer having the desired characteristics. The amount of benzoyl chloride added may be from about 0.02% to 0.2% by weight of the product, preferably about 0.05% to 0.15%, i.e., 0.10%.

The following examples of the process of this invention are to be considered illustrative only and not limiting. In the examples POLY BD45HT is a homopolymer of butadiene made by Arco Chemicals, having a viscosity of 50 poises at 30° C., a hydroxyl value of 0.83 meq/gm., a hydroxyl number (mq.KOH/gm.) of 46.6, an average molecular weight of 2800, and an iodine number of 398.

EXAMPLE 1

To a five-liter flask equipped with stirrer, thermometer and nitrogen blanket were charged at room temperature 1144 grams of POLY BD45HT and 1814 grams of ISONATE 143L (Upjohn), a polyphenylene polyisocyanate. The mixture was heated under nitrogen with stirring to 170° C. and held at that temperature for 2.5 hours. The product was then cooled to 98° C. and 2.96 grams of benzoyl chloride was added. The product had a NCO content of 15.5% (16.5% theory), a viscosity at 25° C. of 72 poises and a Gardner Color of 6. The product on storage at room temperature did not turn milky or separate into two layers for 6 months.

EXAMPLE 2

To a two-liter flask equipped as in Example 1 were charged 572 grams of POLY BD45HT and 771 grams of PAPI 901 (Upjohn), a polyphenylene polyisocyanate. The mixture was heated under nitrogen at 160° C. for 1.5 hours. The product was cooled to 100° C. and 1.3 grams of benzoyl chloride was added. The product had a NCO content of 15.44% (16.5% theory), and a viscosity at 25° C. of 254 poises. The product remained single-phased on storage at room temperature.

EXAMPLE 3

To a flask equipped as in Example 2 were charged 629 grams of POLY BD45HT and 816 grams of MONDUR 432 (Mobay) a polyphenylene polyisocyanate. After heating with stirring under nitrogen for 1.75 hours at 165° C., the product was cooled to 35° C. and 1.45 grams of benzoyl chloride was added. The product had a NCO content of 15.41% (15.8% theory) and a viscosity of 316 poises at 25° C. It did not turn milky or separate in two phases on storage at room temperature for six months.

What is claimed is:

1. A process for preparing urethane prepolymers resistant to the formation of multiple phases or layers upon storage which comprises reacting a viscous, normally liquid hydroxy-terminated polymer of conjugated diene of 4 to 8 carbon atoms and normally liquid, relatively non-volatile, aromatic polyisocyanate at a temperature above about 150° C. to form an isocyanate-terminated urethane prepolymer having an isocyanate group content of at least about 10 weight percent.

2. A process according to claim 1 wherein said polyisocyanate is trihydrocarbyl phosphate-modified methylenebis (phenylisocyanate).

3. A process according to claim 1 wherein said polyisocyanate is polyarylene polyisocyanate.

4. A process according to claim 1, 2 or 3 wherein said temperature is about 160° C. to 180° C.

5. A process according to claim 4 wherein said hydroxy-terminated diene polymer is a hydroxy-terminated polybutadiene.

6. A process according to claim 5 wherein said hydroxy-terminated diene polymer has a hydroxyl-functionality of about 2.1 to 2.6.

7. A process according to claim 6 wherein said hydroxy-terminated diene polymer has a majority of its unsaturation in the main hydrocarbon chain.

8. A process according to claim 1, 2 or 3 wherein said hydroxy-terminated diene polymer is a hydroxy-terminated polybutadiene.

9. A process for preparing urethane prepolymers resistant to the formation of multiple phases or layers upon storage which comprises reacting a hydroxy-terminated diene polymer having a molecular weight of about 700 to 12,000 and normally liquid, relatively non-volatile, aromatic polyisocyanate at a temperature above about 150° C. to form an isocyanate-terminated urethane prepolymer having an isocyanate group content of at least about 10 weight percent.

10. A process according to claim 9 wherein said polyisocyanate is trihydrocarbyl phosphate-modified methylenebis (phenylisocyanate).

11. A process according to claim 9 wherein said polyisocyanate is polyarylene polyisocyanate.

12. A process according to claim 9, 10 or 11 wherein said temperature is about 160° C. to 180° C.

13. A process according to claim 9, 10 or 11 wherein said hydroxy-terminated diene polymer has a hydroxyl-functionality of about 2.1 to 2.6.

14. A process according to claim 13 wherein said hydroxy-terminated diene polymer is a hydroxy-terminated polybutadiene.

15. A process according to claim 13 wherein said hydroxy-terminated diene polymer has a majority of its unsaturation in the main hydrocarbon chain.

16. A process of claim 9, 10, 11, 14 or 15 wherein the molecular weight of said hydroxy-terminated diene polymer is about 1000 to 5000.

17. A process according to claim 16 wherein said hydroxy-terminated diene polymer has a hydroxyl-functionality of about 2.1 to 2.6.

18. A process according to claim 17 wherein said temperature is about 160° C. to 180° C.

* * * * *